April 23, 1963 P. J. MINEAU ET AL 3,086,715
AERATOR PUMP
Filed Oct. 31, 1960
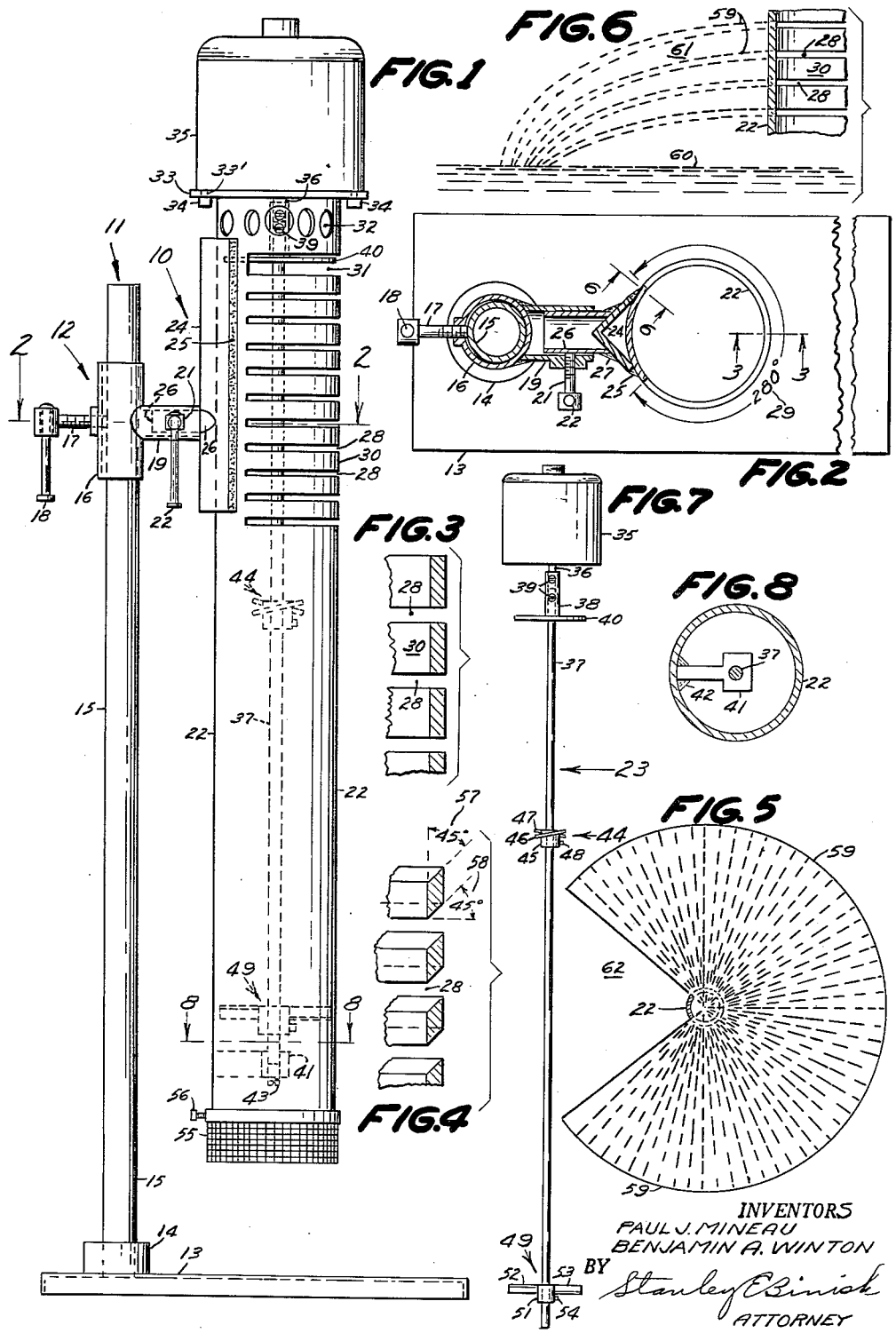
INVENTORS
PAUL J. MINEAU
BENJAMIN A. WINTON
BY
Stanley E. Binish
ATTORNEY

United States Patent Office 3,086,715
Patented Apr. 23, 1963

3,086,715
AERATOR PUMP
Paul J. Mineau, 825 S. Baird St., Green Bay, Wis., and Benjamin A. Winton, Scott, Wis. (Rte. 1, Adell, Wis.)
Filed Oct. 31, 1960, Ser. No. 66,248
3 Claims. (Cl. 239—281)

This invention relates particularly to improvements in water aerator and circulator pumps for trout pools or ponds, or the like.

The general purpose of this invention is to provide a water aerator and circulator pump of large volume capacity, yet relatively portable, for effectively aerating fish pools and ponds and maintaining the fish therein in a healthy and lively condition, patricularly through the critical hot and humid summer months.

In a test that simulated extra severe conditions, trout were overcrowded in a water filled tank and the water inlet to the tank completely shut off, thereby diminishing the fresh water supply. The fish were then allowed to reach a near danger point before the present aerator pump was put in operation. In a matter of minutes the aerator pump supplied sufficient fresh oxygen to the water to restore the fish to normal movement and without the slightest sign of distress.

Lack of oxygen is one of the greatest of fish killers, both in summer and winter. During the summer, water will usually absorb oxygen during cool nights. However, several hot humid nights can reduce the oxygen in the water to a danger point. Small trout ponds are particularly vulnerable, particularly the many privately owned trout ponds which are steadily increasing in number throughout the country. The present improved aerator pump provides a solution to the oxygen problem for the small commercial trout pond operator.

The conventional minnow bucket aerator, and the compressed air means for trout transported by tank truck, have not been satisfactory when applied to pools or ponds. Ponds and pools present special problems in the aeration thereof.

The present improved aerator pump is not limited to trout ponds. It has wide application in the field of aeration, generally. For instance it can be used in the aeration of sewage as well as in the aeration of aquariums; and it can be applied to natural lakes that have been control poisoned, to shorten the reconditioning period thereof. Also where trout are concentrated in pools of natural streams during low water and hot weather conditions, the present aerator pump can be used to restore and maintain the oxygen content necessary for the survival of trout therein, and thereby salvage and save untold thousands of trout that up to this time represent a total loss.

An object of this invention is the provision of a portable aerator pump of large volume capacity, satisfactory for pools, ponds and lakes.

Another object is to provide a portable aerator pump of large volume capacity that is simple and cheap to construct, and highly efficient in its work.

Still another object of this invention is the provision of an aerator pump adapted to discharge water therefrom in the form of a series of superimposed umbrella-like sheets, spaced one from another and having a small corresponding sector absent from each sheet.

Yet another object is to provide an aeration pump rotatable about a transverse axis substantially through the center of gravity of the pump.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a side elevation view of the invention;
FIG. 2 is a section view of the apparatus taken on line 2—2 of FIG. 1, looking in the direction of the arrows;
FIG. 3 is a fragmentary section view taken on line 3—3 of FIG. 2, showing the discharge slots;
FIG. 4 illustrated a modification of the slots of FIG. 3, showing the slot edges beveled;
FIG. 5 is a diagrammatic view, in top plan, showing the water pattern emitted from a discharge slot;
FIG. 6 is a diagrammatic view, in side elevation, showing the edges of separate water sheets emitted from a plurality of adjacent discharge slots;
FIG. 7 is an elevation view of the assembled motor and impeller shaft, per se; and
FIG. 8 is a section view of the pump cylinder taken on line 8—8 of FIG. 1, showing the bearing means for the lower end of the impeller shaft.

Referring now to the drawings, wherein like reference characters designate like or corresponding parts throughout the several views, there is shown, in FIG. 1, a vertically disposed aeration pump generally indicated at 10, adjustably supported on a standard generally indicated at 11, through means of slidable sleeve mount means generally indicated at 12.

The standard 11 comprises a flat plate-like base 13 having an apertured and threaded boss 14 adjacent one end thereof, intermediate the sides thereof, and an upright post or tube 15 threadedly engaged in said apertured boss 14. The base 13 is of a bearing area suitable for placement on a substantially firm surface or a soft mud surface, as encountered. The post 15 is of a length suitable for the intended purpose, as hereinafter disclosed.

The sleeve mount means 12 comprises a main sleeve 16 loosely fitted around post 15, and a radially related set screw 17 threadedly engaged through the wall of said main sleeve 16, said set screw being provided with a transverse handle 18 for applying a rotative force to said set screw 17, for securing the mount 12 to the standard 11. Diametrically opposite of and axially aligned with said set screw is provided a lateral sleeve 19, welded thereto. Said main sleeve 16 and laterally projecting sleeve 19 provide a T-shaped arrangement. A radially disposed set screw 21 is threadedly engaged through the wall of said lateral sleeve 19, and is provided with a radial handle 22 for applying torque to said set screw 21. The sleeve 16 is loosely fitted around the post 15 to prevent said two elements from tightly rusting together, in view of the wet conditions under which they are required to operate.

The aeration pump 11 comprises an elongated upright hollow cylinder 22 and a motor driven impeller shaft means disposed therein and generally indicated at 23.

To the upper portion of the rear side of said cylinder is longitudinally secured an angle iron 24 as by welding 25.

A radially projecting tubular trunnion 26 is secured astraddle the apex of the angle iron 24 as by means of welding 27. The trunnion 26 is loosely received in lateral sleeve or bearing 19, and rotatably supported therein for reasons hereinafter disclosed. The loose fitting of the trunnion 26 in the sleeve bearing 19 prevents said two elements from tightly rusting together, in view of the wet conditions under which they are required to operate. The cylinder 22 is normally positioned upright, and is secured in that position through means of set screw 21.

The frontal upper wall portion of said cylinder 22 is provided with a plurality of longitudinally spaced horizontal discharge slots such as indicated at 28, said slots extending for about 280 degrees of curvature, as indicated at 29, see FIG. 2. Said slots commencing adjacent one side of the angle iron 24 and terminating adjacent the other side of said angle iron, thereby leaving an unslotted rearward cylinder wall portion of about 80 degrees of curvature between said slot terminals, said angle iron being disposed substantially centrally of said unslotted portion.

Slots of substantially one-eighth inch depth, with substantially five-eighths inch lands therebetween, such as indicated at 30, have resulted in a satisfactory pumping and aerating operation, although it is to be understood that the invention is not limited to such dimensions. Slots of approximately 280 degrees of curvature have resulted in a satisfactory pumping and aerating operation, although it is to be understood that the invention is not limited to such arcuate dimension. It is important, however, that the unslotted wall portion between the slot terminals be of sufficient dimension to provide an adequate zone suitable for the free flow of air into the space between the layers of discharge water, and that the flow of air be unhindered by the presence of such flowing water.

The topmost slot 31 is a wider slot to provide an overflow outlet for excess water, and to otherwise provide a by-pass for the pumped water in the event that the discharge slots become unduly clogged with foreign matter. Additioal overflow and by-pass apertures, such as indicated at 32, are provided as a safety margin.

The top end of the cylinder 22 is provided with an annular mounting flange 33 having a plurality of equally spaced apertures therethrough, such as indicated at 33', for the reception of conventional mounting bolts 34 to secure drive means such as conventional motor 35 thereon. Obviously a gasoline engine, or the like, can be used in lieu of a motor.

The armature shaft 36 of said motor is disposed coaxially with the axis of cylinder 22.

A propeller shaft 37, see FIGS. 1 and 7, axially aligned with armature shaft 36, is coupled thereto by means of sleeve coupling 38 and set screws such as indicated at 39. The lower end of the propeller shaft 37 is received in a thrust bearing 41, see FIGS. 1 and 8, which is fixed to the inner periphery of the cylinder as by welding 42. Said thrust bearing is provided with a threadedly engaged adjustable element 43 for taking up the wear in said bearing means.

A slinger disc 40, on the lower end of sleeve coupling 38, and integral therewith, is provided to aid in ejecting the overflow water through slot 31 and to otherwise prevent water from working up into motor 35.

Propeller means, generally indicated at 44, see FIGS. 1 and 7, is fixedly mounted on propeller shaft 37 and disposed substantially below the lowermost discharge slot. Said propeller means 44 comprises a hub 45 having pitched blades 46 and 47 fixed on opposite sides thereof. The hub is fixed on the propeller shaft by means of a set screw 48.

Companion propeller means, generally indicated at 49, is fixedly mounted on propeller shaft 37 and disposed substantially above the end of cylinder 22, and adjacently above bearing means 41. Said propeller means 49 comprises a hub 51 having pitched blades 52 and 53 fixed on opposite sides thereof. The hub is fixed on the propeller shaft by means of set screw 54.

The propeller shaft 37 and propeller means 44 and 49 thereon are rotated in the cylinder 22 so as to lift water in the cylinder and discharge it therefrom through slots 28.

A screen 55 is secured across the open lower end of cylinder 22 by means of set screw 56. Said screen functions to prevent the inflow of foreign matter, likely to clog the discharge slots, into the cylinder.

FIG. 4 shows a modification of the discharge slots in that the upper and lower slot edges are beveled at 45 degrees, as indicated at 57 and 58, respectively. The beveled edges function to discharge water from the slots in an upward and outward trajectory, as distinguished from the outward trajectory from the unbeveled slots shown in FIGS. 6, 3 and 1.

*Operation.*—The fully assembled hereinbefore described aerator pump is positioned in a pool of water so that the base 13 rests on the bottom of the pool. The torsion handle 18 is then manipulated to loosen set screw 17, and the associated slidable sleeve mount 12 is moved along the post 15 until substantially the lower one-third portion of the cylinder 22 is submerged in the water. The motor 35 can then be energized from any suitable source of electrical potential, not shown, and the propellers rotated thereby. As the propellers are revolved, the mass of water in the cylinder is forced and moved spirally upwardly in an ascending spiraling centrifugal path, to the slots 28, from whence the water is finally centrifugally discharged into the atmosphere and thence allowed to fall back into the pool. The centrifugal energy imparted to the water is generated by the rotation of the mass of water in the cylinder by the propellers.

The water is discharged from the plurality of slots 28, into a pool 60, in a series or set of umbrella-like or dome-like sheets or layers, such as indicated at 59, with spaces such as indicated at 61 between said layers, see FIG. 6.

The plan pattern of the discharged sheets of water 59, as shown in FIG. 5, is substantially a 280° sector of a circle or disc. In other words, the plan view of the discharged water sheets can each be likened to a pie with a small sector cut portion 62 removed therefrom.

Said unoccupied sector spaces 62, and the spaces 61 between the layers 59 are important to the invention, in that said spaces provide a passageway communicating between the atmosphere and the various layers 59, for the free and unobstructed inflow of air to the individual layer surfaces. As the air contacts the exposed layer surfaces, oxygen is picked up and absorbed by the various water sheets, thereby aerating and oxygenating the pumped and discharged water.

A constant circulation of fresh air into the spaces between the layers is promoted by the falling sheets of water. The motion of the falling layers of water tends to drag the air between layers along with the water, thereby causing a circulation to and through the turbulent zone where the falling water impinges upon the pool surface. In this zone the violent turbulence of the water causes repeated contact and intermingling of divided water particles with the air, thereby causing additional absorption of oxygen by the water.

In the event the screen 55 becomes clogged with foreign material, such as leaves or grass, or the like, one need merely to loosen set screw 21, through means of handle 22, on mount means 12, and rotate the pump means 11 about the axis of trunnion 26 supported in sleeve bearing 19, whereby the lower screen end of the pump can be swung upwardly, above the surface of the pool, the set screw re-tightened, and the screen conveniently cleaned. After the cleaning has been accomplished, the set screw can be loosened, the pump swung down to its operative upright position, and the set screw re-tightened.

To facilitate the rotation of the pump for cleaning purposes, the axis of the trunnion is disposed substantially at the center of gravity of the assembled pump, or slightly thereabove to allow for the buoyant effect when the lower end is submerged in water.

Some characteristic features of this invention are the provision of a portable aerator pump of large volume capacity; the provision of an aerator pump that is simple and cheap to construct; the provision of an aerator pump that is highly efficient in its oxygenating function; and the provision of an aerator pump having a cylinder provided with a plurality of spaced horizontal discharge slots; said slots extending substantially 280 degrees in curvature, for forming a water sheet discharge pattern likened to a set or series of superimposed umbrellas, having small sectors removed therefrom.

Obviously many modifications and variations of the present invention are possible in the light of the above teachings. It is therefore to be understood, that within the scope of the appended claims, the invention may be practiced otherwise than as specifically described.

What is claimed and desired to be protected by Letters Patent of the United States is:

1. An aerator pump, comprising: a vertical hollow cylinder having an imperforate cylindrical lower wall portion and an adjacent cylindrical upper wall portion, said upper wall portion having narrow substantially circumferential discharge slot means extending partially around said cylinder, the terminals of said slot means being spaced from each other by a wall portion of said cylinder whereby to provide a break or opening in the dome-like sheet of water dischargeable from said slot means, said opening communicating between the atmosphere and the zone within such dome-like sheet of water dischargeable from said slot means; a rotatable shaft in said cylinder; propeller means mounted on said shaft to rotate therewith and disposed adjacent the lower part of said imperforate lower wall portion thereby defining a cylindrical imperforate wall portion extending from a zone adjacent said propeller means to said slot means for aiding in imparting an ascending spiral action to water in said cylinder, acted on by said propeller means, whereby to provide the centrifugal energy for discharging such water through said discharge slot means, and a trunnion projecting laterally from said cylinder and disposed rearwardly of said slots; support means; and bearing means on said support means for rotatably supporting said trunnion.

2. An aerator pump, comprising: a vertical hollow cylinder having an imperforate cylindrical lower wall portion and an adjacent cylindrical upper wall portion, said upper wall portion having narrow substantially circumferential discharge slot means extending partially around said cylinder, the terminals of said slot means being spaced from each other by a wall portion of said cylinder whereby to provide a break or opening in the dome-like sheet of water dischargeable from said slot means, said opening communicating between the atmosphere and the zone within such dome-like sheet of water dischargeable from said slot means; a rotatable shaft in said cylinder; propeller means mounted on said shaft to rotate therewith and disposed adjacent the lower part of said imperforate lower wall portion thereby defining a cylindrical imperforate wall portion extending from a zone adjacent said propeller means to said slot means for aiding in imparting an ascending spiral action to water in said cylinder, acted on by said propeller means, whereby to provide the centrifugal energy for discharging such water through said discharge slot means, and a trunnion projecting laterally from said cylinder and disposed rearwardly of said slots; support means; mount means slidably mounted on said support means; bearing means on said mount means for rotatably supporting said trunnion; lock means on said mount means, engageable with said support means, for fixing the position of said mount means on said support means; and lock means on said bearing means, engageable with said trunnion, for fixing said trunnion in any preselected angular position relative to the bearing means.

3. An aerator pump, comprising: a vertical hollow cylinder having an imperforate cylindrical lower wall portion and an adjacent cylindrical upper wall portion, said upper wall portion having narrow substantially circumferential discharge slot means extending partially around said cylinder, the terminals of said slot means being spaced from each other by a wall portion of said cylinder whereby to provide a break or opening in the dome-like sheet of water dischargeable from said slot means, said opening communicating between the atmosphere and the zone within such dome-like sheet of water dischargeable from said slot means; a rotatable shaft in said cylinder; propeller means mounted on said shaft to rotate therewith and disposed adjacent the lower part of said imperforate lower wall portion thereby defining a cylindrical imperforate wall portion extending from a zone adjacent said propeller means to said slot means for aiding in imparting an ascending spiral action to water in said cylinder, acted on by said propeller means, whereby to provide the centrifugal energy for discharging such water through said discharge slot means, and a trunnion projecting laterally from said cylinder; support means; and bearing means on said support means for rotatably supporting said trunnion.

References Cited in the file of this patent

UNITED STATES PATENTS

| | | |
|---|---|---|
| 1,667,669 | Megee | Apr. 24, 1928 |
| 1,673,594 | Schmidt | June 12, 1928 |
| 2,464,456 | McGillis et al. | Mar. 15, 1949 |
| 2,569,110 | McGillis et al. | Sept. 25, 1951 |
| 2,598,529 | Fritz | May 27, 1952 |
| 2,868,132 | Rittershofer | Jan. 13, 1959 |